Aug. 22, 1933.  C. C. FARMER  1,923,141
FLUID PRESSURE BRAKE
Filed Dec. 10, 1930
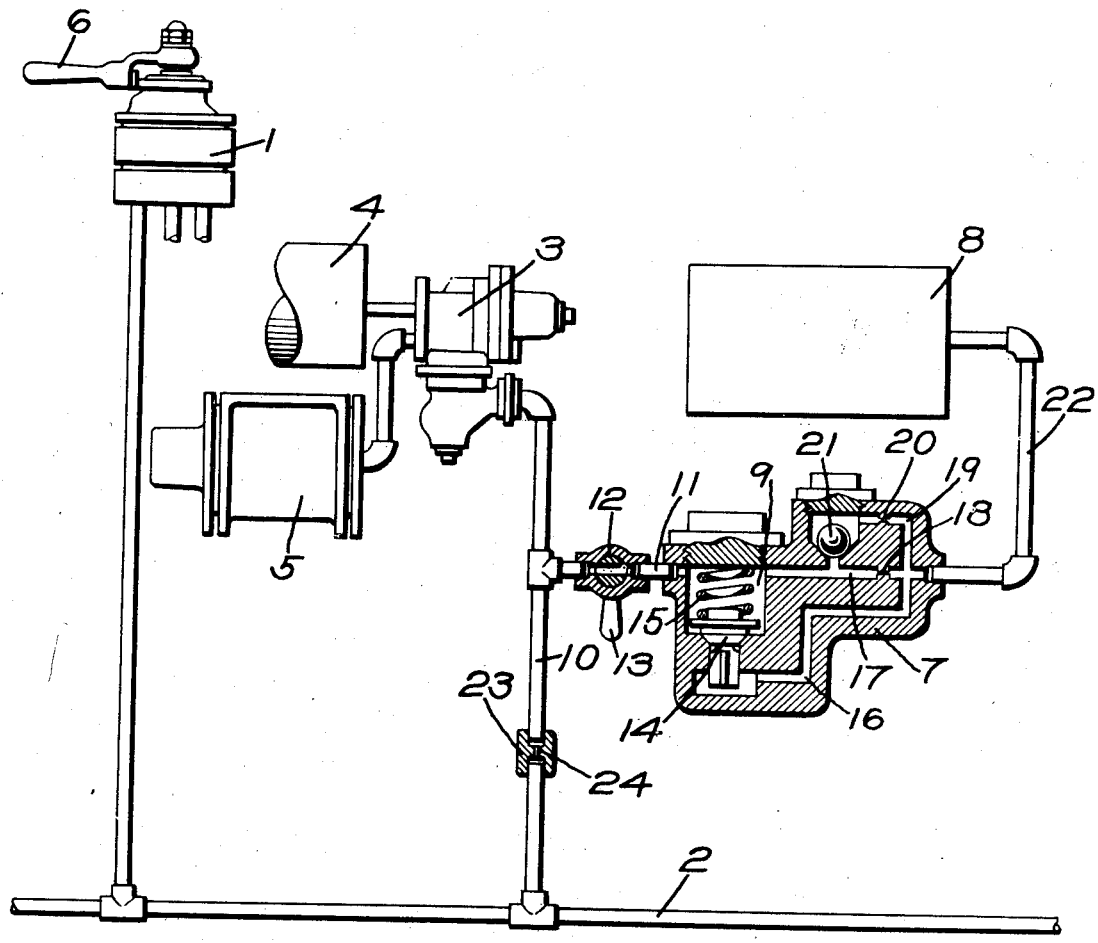
INVENTOR.
CLYDE C. FARMER
BY
Wm. M. Cady
ATTORNEY.

Patented Aug. 22, 1933

1,923,141

UNITED STATES PATENT OFFICE 1,923,141

FLUID PRESSURE BRAKE

Clyde C. Farmer, Pittsburgh, Pa., assignor to The Westinghouse Air Brake Company, Wilmerding, Pa., a Corporation of Pennsylvania Application December 10, 1930
Serial No. 501,411

8 Claims. (Cl. 303—40)

This invention relates to fluid pressure brakes, and more particularly to an automatic fluid pressure brake system in which the brakes are applied by effecting a reduction in brake pipe pressure.

When the brakes are applied by effecting a reduction in brake pipe pressure, the reduction is first effective at the head end of the train to apply the brakes on cars at the head end of the train, before the brakes are applied on cars at the rear end of the train, with the result that the slack tends to run in and sometimes cause excessive shocks.

The principal object of my invention is to provide means for delaying the application of the brakes on the locomotive, so that the inertia of the locomotive will tend to keep the slack from running in at the head end of the train and thus excessive shocks will be prevented.

In the accompanying drawing, the single figure is a diagrammatic view of a locomotive fluid pressure brake equipment embodying my invention.

For the purposes of the present invention, it is deemed sufficient to represent the locomotive brake equipment in an elementary form comprising brake valve device 1, connected to the usual brake pipe 2, a triple valve device 3, an auxiliary reservoir 4, and a brake cylinder 5.

When the handle 6 of the brake valve device is turned to service application position, the pressure in the brake pipe 2 is reduced in the usual manner and the triple valve devices on the cars in the train as well as the triple valve device 3 on the locomotive are operated to effect the supply of fluid from the auxiliary reservoir to the brake cylinder.

According to my invention, there is provided on the locomotive a valve device 7 and a volume reservoir 8. In the casing of the valve device 7 is a chamber 9, which is connected to the triple valve branch pipe 10 by a pipe 11, containing a cut-out cock 12, adapted to be operated by a handle 13. In chamber 9 is a check valve 14, urged to its seat by spring 15 and adapted to permit flow from a passage 16 to chamber 9.

A passage 17 having a restricted flow portion 18 leads to chamber 9 and a by-pass passage 19 is provided around the choke 18, said passage 19 having a restricted flow portion 20 and a check valve 21.

The passage 17 is connected by pipe 22 to the volume reservoir 8 and passages 16 and 19 open into passage 17 at a point between the choke 18 and the pipe 22. A fitting 23 is provided in the branch pipe 10 and said fitting has a restricted flow passage 24 to restrict the rate of flow between the pipe 10 and the brake pipe 2, the passage 24 being of the minimum flow area that will provide the desired rapidity of changes in pressure on the piston of the triple valve device 3.

When the brake pipe 2 is charged with fluid under pressure in the usual manner, fluid is supplied through the branch pipe 10 and to the triple valve device 3. Fluid under pressure also flows through pipe 11, and passage 17 to pipe 22, so that the volume reservoir 8 is charged with fluid under pressure.

When the brake pipe pressure is reduced to effect an application of the brakes, the brake pipe pressure on the face of the equalizing piston of the triple valve device 3 is reduced sufficiently to ensure movement of the piston from release position, so as to close the usual feed groove. The spring 15 acting on the check valve 14 is such that it will hold the check valve seated until the reduction in brake pipe pressure in the branch pipe 10 and on the equalizing piston is sufficient to ensure the movement of the piston from release position as above described. After this reduction, the further reduction in brake pipe pressure creates a sufficient differential of pressures to cause the check valve 14 to unseat against the pressure of spring 15, by the action of the pressure in the volume reservoir 8, acting on the under face of the check valve.

It will now be seen that the further reduction in pressure in the branch pipe 10 above the choke 24 must also reduce the pressure in the volume reservoir 8. The choke passage 24 then controls or determines the delay of time in applying the brakes on the locomotive, as compared with the brakes on the cars of the train. In other words, by reason of the added volume of the reservoir 8, and the fact that the choke passage 24 limits the rate of flow from the branch pipe 10 to the brake pipe 2, it requires a longer period of time to effect a given reduction in pressure on the equalizing piston of the locomotive brake controlling valve device than is required on the triple valve devices of the cars of the train.

The choke passage 20 limits or restricts the flow of fluid from the branch pipe 10 to the volume reservoir 8 when the brake pipe pressure is increased to release the brakes, so that the volume reservoir recharge does not substantially cut down the rate of increase in brake pipe pressure in the branch pipe and on the equalizing piston of the triple valve device, and consequently, the movement of the piston to release position, and the usual rate of recharge of the auxiliary reservoir is not slowed down. The ball check 21 prevents back flow from the reservoir 8, by way of passage 18 to the branch pipe 10.

The choke passage 18 is of very small flow area and is only provided for the purpose of ensuring equalization of the pressure in the volume reservoir 8 with the brake pipe during fluctuations in brake pipe pressure. The cut-out cock 12 provides means for cutting out the delay device when double heading or when the locomotive is hauled as a dead engine.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a locomotive brake equipment including a brake controlling valve device operated upon a reduction in brake pipe pressure for effecting an application of the brakes, of a supplemental volume chamber connected to the brake pipe side of said valve device which increases the brake pipe volume above normal and means for limiting the flow of fluid from said valve device and said chamber to the brake pipe to a fixed rate when the brake pipe pressure is reduced, which rate is less than the rate at which the brake pipe pressure is reduced.

2. In a fluid pressure brake, the combination with a brake pipe and a locomotive brake equipment including an equalizing valve device operated upon a reduction in brake pipe pressure for effecting an application of the brakes, of a supplemental volume reservoir open to the brake pipe side of said valve device for increasing the brake pipe volume above normal, and a constantly fixed restricted passage through which the pressure in said reservoir and on said valve device is reduced at a rate less than the brake pipe pressure is reduced when the brake pipe pressure is reduced to effect an application of the brakes.

3. In a fluid pressure brake, the combination with a brake pipe and apparatus on the locomotive including an equalizing valve device operated upon a reduction in brake pipe pressure for effecting an application of the brakes, of a fixed restricted passage through which fluid under pressure is vented from said valve device to the brake pipe, a volume reservoir connected to the brake pipe side of said valve device, and means operated upon a predetermined reduction in fluid pressure on the brake pipe side of said valve device for opening a communication through which fluid under pressure is vented from said reservoir to the brake pipe side of said valve device.

4. In a fluid pressure brake, the combination with a brake pipe and apparatus on the locomotive including an equalizing valve device operated upon a reduction in brake pipe pressure for effecting an application of the brakes, a branch pipe connecting the brake pipe side of said valve device with the brake pipe and having a constantly restricted passage for limiting the rate of flow of fluid from said valve device to the brake pipe, of a volume reservoir, means for charging said reservoir with fluid under pressure from the brake pipe, and means operated upon a predetermined reduction in pressure in the branch pipe for opening a communication through which fluid under pressure flows from the reservoir to the branch pipe.

5. In a fluid pressure brake, the combination with a brake pipe and apparatus on the locomotive including an equalizing valve device operated upon a reduction in brake pipe pressure for effecting an application of the brakes, a branch pipe connecting the brake pipe side of said valve device with the brake pipe and having a restricted passage for limiting the rate of flow of fluid from said valve device to the brake pipe, of a volume reservoir, means for charging said reservoir with fluid under pressure from the brake pipe, and a check valve controlling a flow communication from the volume reservoir to the branch pipe and operated upon a predetermined reduction in fluid pressure in said branch pipe for opening said communication.

6. In a fluid pressure brake, the combination with a brake pipe and apparatus on the locomotive including an equalizing valve device operated upon a reduction in brake pipe pressure for effecting an application of the brakes, a branch pipe connecting the brake pipe side of said valve device with the brake pipe and having a restricted passage for limiting the rate of flow of fluid from said valve device to the brake pipe, of a volume reservoir, means for charging said reservoir with fluid under pressure from the brake pipe, a check valve controlling a flow communication from the volume reservoir to the branch pipe and subject to the opposing pressures of the branch pipe and said reservoir, and a spring for opposing the opening of said valve.

7. In a fluid pressure brake, the combination with a brake pipe and a locomotive brake equipment including a brake controlling valve device operated upon a reduction in brake pipe pressure for effecting an application of the brakes, of a volume reservoir connected to the brake pipe side of said valve device and having a passage provided with a restricted flow area through which fluid under pressure is supplied from the brake pipe to said reservoir, a check valve for preventing back flow through said passage, and means operated upon a predetermined reduction in fluid pressure on the brake pipe side of said valve device for opening a communication through which fluid flows from the reservoir to the brake pipe side of said valve device.

8. In a fluid pressure brake, the combination with a brake pipe and a locomotive brake apparatus including an equalizing valve device operated upon a reduction in brake pipe pressure for effecting an application of the brakes and a branch pipe connecting said valve device to the brake pipe, of a volume reservoir connected to said branch pipe and having a restricted passage through which fluid under pressure is supplied from the brake pipe through said branch pipe to the reservoir, a check valve for preventing back flow through said passage, and means operated upon a predetermined reduction in pressure in said branch pipe for opening a communication through which fluid under pressure is vented from the reservoir to the branch pipe.

CLYDE C. FARMER.